(12) United States Patent
Yang et al.

(10) Patent No.: US 12,476,676 B2
(45) Date of Patent: Nov. 18, 2025

(54) WIRELESS COMMUNICATION METHOD, RELATED APPARATUS, AND DEVICE

(71) Applicant: Huawei Technologies Co., Ltd., Shenzhen (CN)

(72) Inventors: Zhongjie Yang, Shanghai (CN); Huaijie Xue, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 18/585,462

(22) Filed: Feb. 23, 2024

(65) Prior Publication Data

US 2025/0274170 A1 Aug. 28, 2025

Related U.S. Application Data

(63) Continuation of application No. PCT/CN2022/091878, filed on May 10, 2022.

(30) Foreign Application Priority Data

Aug. 24, 2021 (CN) .......................... 202110984826.6

(51) Int. Cl.
 *H04B 7/0456* (2017.01)
 *H04B 7/06* (2006.01)
(52) U.S. Cl.
 CPC ......... *H04B 7/0456* (2013.01); *H04B 7/0626* (2013.01)
(58) Field of Classification Search
 CPC ... H04L 5/0023; H04L 1/0026; H04L 5/0048; H04L 1/06; H04L 1/0003; H04L 25/0224; H04L 5/0051; H04L 2025/03426; H04B 7/0413; H04B 7/0456; H04B 7/0417; H04B 7/0617; H04B 7/0632; H04B 7/0473; H04B 7/0639; H04B 7/06; H04B 7/0626;

(Continued)

(56) References Cited

U.S. PATENT DOCUMENTS 8,666,334 B2 * 3/2014 Kang ................... H04L 27/2626
 370/335
10,886,979 B2 * 1/2021 Forenza ............... H04B 7/0452
(Continued)

FOREIGN PATENT DOCUMENTS

CN 104079329 A 10/2014

*Primary Examiner* — Eva Y Puente
(74) *Attorney, Agent, or Firm* — Slater Matsil, LLP

(57) ABSTRACT

Embodiments of this application disclose a wireless communication method, a related apparatus, and a device. Configuring at least two virtual antenna mapping matrices, where each of the at least two virtual antenna mapping matrices indicates a mapping relationship between four antenna ports and N physical channels, and N is an integer greater than 4; obtaining channel state information of a target terminal device in a target cell; and then determining, based on the channel state information, that the mapping relationship between the four antenna ports and the N physical channels is a mapping relationship indicated by a target virtual antenna mapping matrix in the at least two virtual antenna mapping matrices, and performing wireless communication with the target terminal device by using the target virtual antenna mapping matrix.

18 Claims, 5 Drawing Sheets

(58) Field of Classification Search
CPC .. H04B 7/063; H04W 52/146; H04W 52/325; H04W 52/42; H04W 52/16; H04W 88/08; H04W 52/367; H04W 72/23; H04W 24/10

See application file for complete search history.

(56) References Cited

U.S. PATENT DOCUMENTS

| | | | |
|---|---|---|---|
| 11,528,062 B2 * | 12/2022 | Zhao | H04W 72/044 |
| 2011/0223876 A1 * | 9/2011 | Kang | H04L 25/0391 |
| | | | 455/129 |
| 2015/0222347 A1 * | 8/2015 | Xia | H04L 5/005 |
| | | | 370/329 |
| 2015/0312919 A1 | 10/2015 | Lee et al. | |
| 2016/0149619 A1 * | 5/2016 | Won | H04B 7/0417 |
| | | | 375/267 |
| 2021/0226674 A1 * | 7/2021 | Ramireddy | H04B 7/0626 |

* cited by examiner

WIRELESS COMMUNICATION METHOD, RELATED APPARATUS, AND DEVICE

CROSS-REFERENCE TO RELATED APPLICATIONS

This application is a continuation of International Application No. PCT/CN2022/091878, filed on May 10, 2022, which claims priority to Chinese Patent Application No. 202110984826.6, filed on Aug. 24, 2021. The disclosures of the aforementioned applications are hereby incorporated by reference in their entireties.

TECHNICAL FIELD

Embodiments of this application relate to the communication field, and in particular, to a wireless communication method, a related apparatus, and a device.

BACKGROUND

With the development of communication technologies, a quantity of antennas included in an antenna array on a base station side is continuously increasing, and a quantity of corresponding physical channels is also increasing. However, in an existing network, there is still user equipment that has not been upgraded, and a quantity of antenna ports supported by the user equipment is less than the quantity of physical channels. Therefore, how to ensure communication between terminal devices and a base station is an urgent problem to be resolved.

In a wireless communication method, in a network using an eight-transmit eight-receive (8T8R) solution, for a terminal device that supports four antenna ports, a preset virtual antenna mapping matrix is configured, to map each of the four antenna ports to two physical channels. This implements mapping from four antenna ports to eight physical channels.

In this method, the antenna ports are mapped to the physical channels based on the preset virtual antenna mapping matrix, each antenna port corresponds to two preset physical channels, and a base station communicates with a terminal device in a cell by using the preset virtual antenna mapping matrix. This reduces flexibility of wireless communication.

SUMMARY

Embodiments of this application provide a wireless communication method, a related apparatus, and a device. When four antenna ports are mapped to N physical channels, a plurality of virtual antenna mapping matrices are configured, based on a channel state of a target terminal device in a target cell, a target virtual antenna mapping matrix that matches the channel state of the target terminal device is selected and determined from the plurality of virtual antenna mapping matrices, and wireless communication is performed with the target terminal device by using the target virtual antenna mapping matrix. Therefore, flexibility of wireless communication is improved. A protocol used by the target terminal device during communication is an LTE R8 protocol, and N is an integer greater than 4.

A first aspect of embodiments of this application provides a wireless communication method, including the following.

With the development of communication technologies, a quantity of antennas of a network device is continuously increasing, and a quantity of physical channels, provided by the network device, used for communication is also increasing. One physical channel corresponds to one column of antenna elements with a same polarization direction. When some terminal devices in a network perform communication, a quantity of antenna ports supported by a protocol used by the terminal devices is less than the quantity of physical channels provided by the network device. To prevent communication of the terminal devices from being affected, the network device configures a virtual antenna mapping (VAM) matrix to implement mapping from the antenna ports to the physical channels. In embodiments of this application, the network device may configure at least two VAM matrices, where each of the at least two VAM matrices indicates a mapping relationship between four antenna ports and N physical channels, and N is an integer greater than 4. The network device may further obtain channel state information (CSI) of a target terminal device in a target cell, where the channel state information reflects channel quality between the target terminal device and the network device. It may be understood that, the network device detects a terminal device that is in coverage of the network device, that is, the target terminal device located in the target cell. A protocol used by the target terminal device during communication is a long term evolution (LTE) R8 protocol. A maximum quantity of antenna ports supported by the LTE R8 protocol is 4. After obtaining the channel state information, the network device may determine, based on the channel state information, that the mapping relationship between the four antenna ports and the N physical channels is a mapping relationship indicated by a target VAM matrix in the at least two VAM matrices. Then, the network device performs wireless communication with the target terminal device by using the target VAM matrix.

In embodiments of this application, when mapping the four antenna ports to the N physical channels, the network device may configure a plurality of VAM matrices. In addition, the network device selects and determines, based on a channel state of the target terminal device in the target cell, the target VAM matrix that matches the channel state of the target terminal device in the target cell from the plurality of VAM matrices, and performs wireless communication with the target terminal device by using the target virtual antenna mapping matrix. Therefore, flexibility of wireless communication is improved. The protocol used by the target terminal device during communication is the LTE R8 protocol, and N is an integer greater than 4.

With reference to the first aspect, in a first implementation of the first aspect of embodiments of this application, the channel state information includes channel quality indicator (CQI) information and rank indication (rank indication, RI) information. After obtaining the CQI information, the network device detects the CQI information to obtain adjustment information corresponding to the CQI information. Then, the network device determines a channel characteristic of the terminal device based on the CQI information, the adjustment information, and the RI information. In addition, the network device determines, based on the channel characteristic, that the mapping relationship between the four antenna ports and the N physical channels is the mapping relationship indicated by the target virtual antenna mapping matrix.

In embodiments of this application, after obtaining the CQI information, the network device detects and adjusts the CQI information, so that the determined channel characteristic is more accurate, to improve accuracy of mapping of the antenna ports.

With reference to the first aspect or the first implementation of the first aspect, in a second implementation of the first aspect of embodiments of this application, N is 2 raised to the power of M, and M is an integer greater than or equal to 3. Each of the four antenna ports establishes a mapping relationship to at least one of the N physical channels, and each of the N physical channels can establish a mapping relationship only to one antenna port.

With reference to the second implementation of the first aspect, in a third implementation of the first aspect of embodiments of this application, M=3, and N=8. Each of the four antenna ports establishes a mapping relationship to two of the eight physical channels, and any two antenna ports are mapped to four different physical channels. In other words, each antenna port is mapped to a completely different physical channel.

With reference to the second implementation of the first aspect, in a fourth implementation of the first aspect of embodiments of this application, M=4 or 5, that is, N=16 or 32. Each of the four antenna ports establishes a mapping relationship to at least one of the 16 or 32 physical channels, and each of the 16 or 32 physical channels can establish a mapping relationship only to one antenna port.

In embodiments of this application, the wireless communication method may be applied to a scenario of mapping between different quantities of antenna ports and physical channels, and can support communication between a plurality of terminal devices and the network device. This improves flexibility of technical solutions of this application.

With reference to any one of the first aspect or the first to the fourth implementations of the first aspect, in a fifth implementation of the first aspect of embodiments of this application, after determining the target virtual antenna mapping matrix, the network device performs weighted processing on user data to be sent to the target terminal device and a cell-specific reference signal (cell-specific reference signal, CRS) of the target cell, to enable the target virtual antenna mapping matrix to be in a working state. In other words, the network device performs wireless communication with the target terminal device by using the target virtual antenna mapping matrix.

A second aspect of embodiments of this application provides a wireless communication apparatus, including: a processing unit, configured to configure at least two virtual antenna mapping matrices, where each of the at least two virtual antenna mapping matrices indicates a mapping relationship between four antenna ports and N physical channels, and N is an integer greater than 4; and an obtaining unit, configured to obtain channel state information of a target terminal device in a target cell, where a protocol used by the target terminal device in a communication state is an LTE R8 protocol.

The processing unit is further configured to: determine, based on the channel state information, that the mapping relationship between the four antenna ports and the N physical channels is a mapping relationship indicated by a target virtual antenna mapping matrix, where the target virtual antenna mapping matrix is included in the at least two virtual antenna mapping matrices; and perform wireless communication with the target terminal device by using the target virtual antenna matrix.

The wireless communication apparatus is configured to perform the method in the first aspect.

A third aspect of embodiments of this application provides a network device, including a processor, a memory, and a communication interface. The processor and the memory are connected to the communication interface, and the processor is configured to perform the method in the first aspect. Beneficial effects shown in this aspect are similar to those in the first aspect, and details are not described herein again.

A fourth aspect of embodiments of this application provides a computer-readable storage medium. The computer-readable storage medium stores a program, and when a computer executes the program, the method in the first aspect is performed.

A fifth aspect of embodiments of this application provides a computer program product. When the computer program product runs on a computer, the computer performs the method in the first aspect.

Beneficial effects of the second aspect to the fifth aspect are shown in the first aspect, and details are not described herein again.

DETAILED DESCRIPTION OF ILLUSTRATIVE EMBODIMENTS

Embodiments of this application provide a wireless communication method, a related apparatus, and a device. When four antenna ports are mapped to N physical channels, a plurality of VAM matrices are configured, based on a channel state of a target terminal device in a target cell, a target VAM matrix that matches the channel state of the target terminal device in the target cell is selected and determined from the plurality of VAM matrices, and wireless communication is performed with the target terminal device by using the target virtual antenna mapping matrix. Therefore, flexibility of wireless communication is improved. N is an integer greater than 4.

Figure 1:
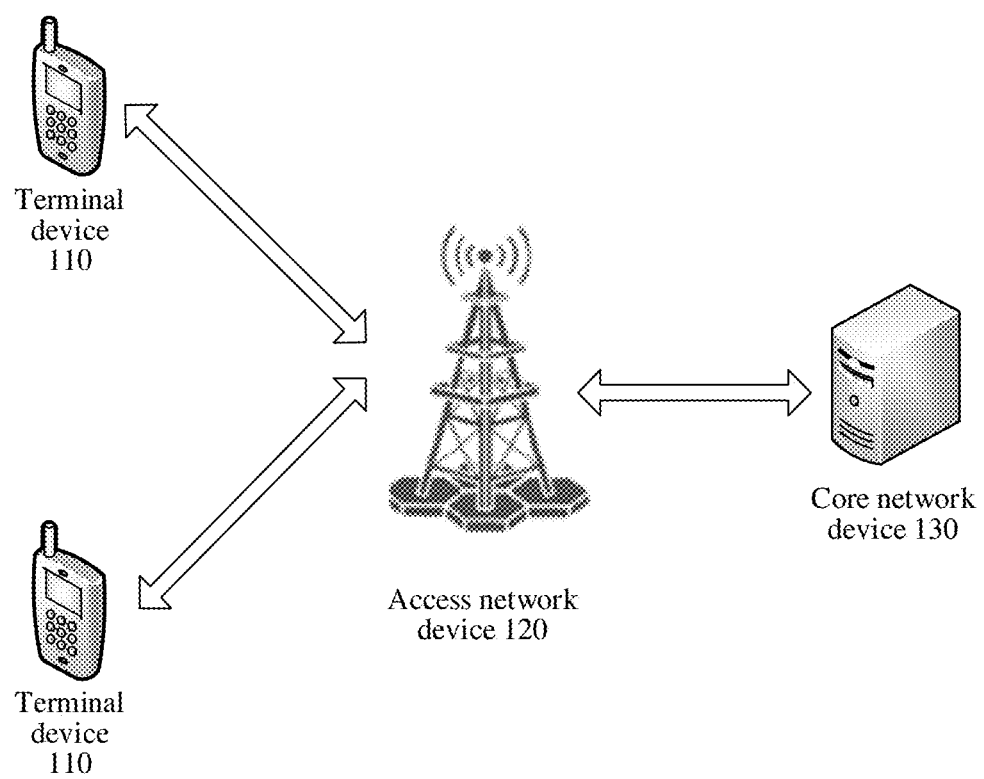
FIG. 1 is a schematic diagram of a network architecture to which a wireless communication method is applied according to an embodiment of this application.

First, a possible network architecture to which embodiments of this application are applicable is described. FIG. 1 is a schematic diagram of a network architecture of a wireless communication method according to an embodiment of this application.

As shown in FIG. 1, a terminal device 110 may communicate with an access network device 120 through a Uu air interface. The Uu air interface may be understood as a universal interface (universal user equipment to network interface) between the terminal device and a network device. Transmission over the Uu air interface includes uplink transmission and downlink transmission. The uplink transmission means that the terminal device 110 sends uplink information to the access network device 120, and the downlink transmission means that the access network device 120 sends downlink information to the terminal device 110.

Optionally, the network architecture shown in FIG. 1 may further include a core network device 130. The terminal device 110 may be connected to the access network device 120 in a wireless manner, and the access network device 120 may be connected to the core network device 130 in a wired or wireless manner. The core network device 130 and the access network device 120 may be independent and different physical devices. Alternatively, the core network device 130 and the access network device 120 may be a same physical device, and all or some of logical functions of the core network device 130 and the access network device 120 are integrated onto the physical device.

It should be noted that, in the network architecture shown in FIG. 1, the terminal device 110 may be at a fixed location, or may be movable. This is not specifically limited herein. The network architecture shown in FIG. 1 may further include other network devices such as a wireless relay device and a wireless backhaul device. This is not specifically limited herein. In the architecture shown in FIG. 1, quantities of terminal devices, access network devices, and core network devices are not limited.

The technical solutions in embodiments of this application may be applied to an LTE system.

Optionally, the terminal device may also be referred to as a terminal or user equipment (UE), and is a device having a wireless transceiver function. The terminal device may be deployed on the land, including indoor or outdoor deployment, or handheld or vehicle-mounted deployment, may be deployed on the water (for example, on a ship), or may be deployed in the air (for example, on an airplane, an unmanned aerial vehicle, a balloon, or a satellite). The terminal device may be a mobile phone, a tablet computer, or a computer with the wireless transceiver function. Alternatively, the terminal device may be a terminal device applied to the fields of virtual reality and augmented reality. In addition, the terminal device may be another type of terminal device, for example, a wireless terminal device applied to industrial control, self driving, telemedicine, a smart grid, transportation safety, a smart city, or a smart home. The terminal device may alternatively be at a fixed location, or may be movable. A type of the terminal device is determined based on an actual application requirement. This is not limited in embodiments of this application.

In embodiments of this application, an apparatus configured to implement a function of the terminal may be the terminal device, or an apparatus that can support the terminal device in implementing the function, for example, a chip system. The apparatus may be installed in the terminal device. In embodiments of this application, the chip system may include a chip, or may include a chip and another discrete component. In the technical solutions provided in embodiments of this application, an example in which the apparatus configured to implement the function of the terminal device is the terminal device is used to describe the technical solutions provided in embodiments of this application.

The network device may be the access network device, and the access network device may also be referred to as a radio access network (RAN) device, and is a device that provides a wireless communication function for the terminal device. There are a plurality of types of access network devices, including an evolved NodeB (eNB), a baseband unit (BBU), a transmission and reception point (TRP), a transmission point (TP), an access point in a Wi-Fi system, or the like. The access network device may alternatively be a radio controller, a central unit (CU), and/or a distributed unit (DU) in a cloud radio access network (CRAN) scenario. In addition, the network device may alternatively be another device, for example, a relay station or a vehicle-mounted device. This is not specifically limited herein.

In embodiments of this application, an apparatus configured to implement a function of the network device may be the network device, or an apparatus that can support the network device in implementing the function, for example, a chip system. The apparatus may be installed in the network device. In the technical solutions provided in embodiments of this application, an example in which the apparatus configured to implement the function of the network device is the network device is used to describe the technical solutions provided in embodiments of this application.

Figure 2:
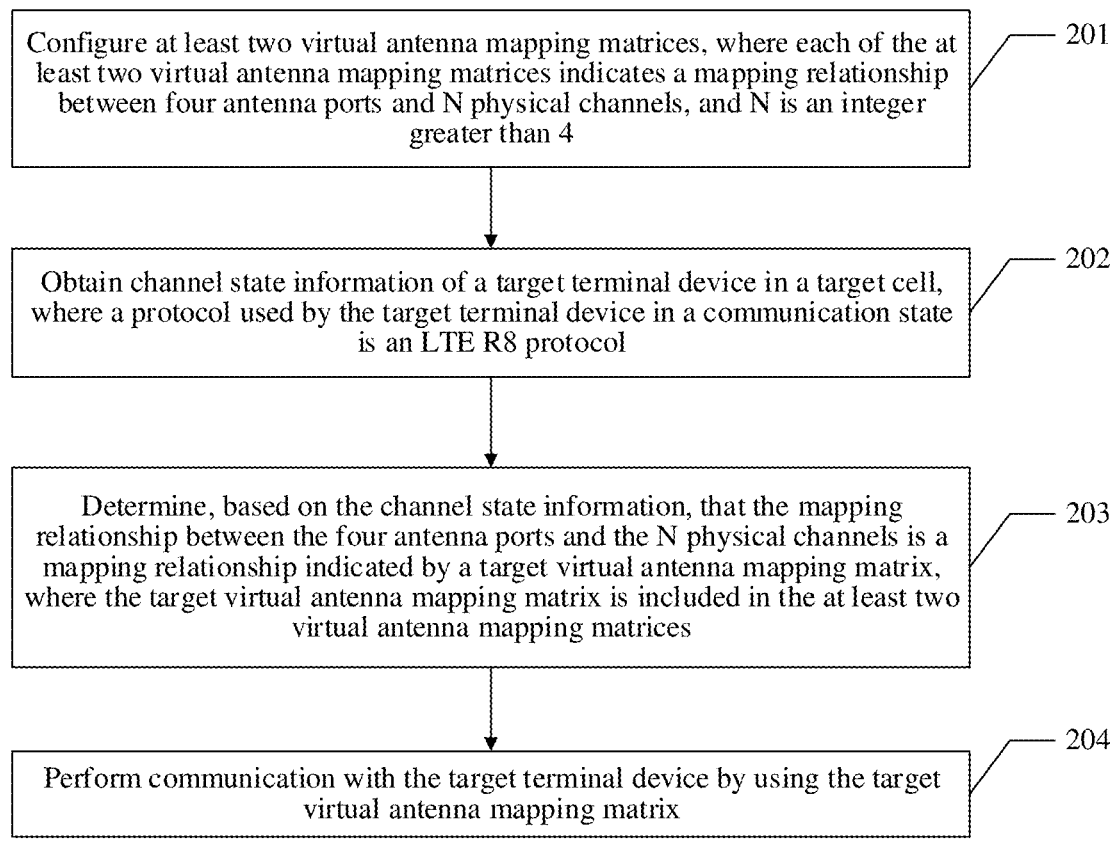
FIG. 2 is a schematic flowchart of a wireless communication method according to an embodiment of this application.

The following describes the wireless communication method provided in embodiments of this application. FIG. 2 is a schematic flowchart of a wireless communication method according to an embodiment of this application. The method includes the following steps.

201: Configure at least two virtual antenna mapping matrices, where each of the at least two virtual antenna mapping matrices indicates a mapping relationship between four antenna ports and N physical channels, and N is an integer greater than 4.

A network device may configure the at least two VAM matrices, where each of the at least two VAM matrices indicates the mapping relationship between the four antenna ports and the N physical channels. A quantity of antenna ports is less than a quantity of physical channels, that is, N>4. In one VAM matrix, each antenna port is mapped to at least one physical channel, and each physical channel is mapped to one antenna port.

For example, in an eight transmitter for three sectors (8T3S) scenario in an LTE network, N=8 is used as an example to describe the mapping relationship. The "eight transmitter" refers to an eight-transmit eight-receive (8T8R) solution.

Figures 3, 4:
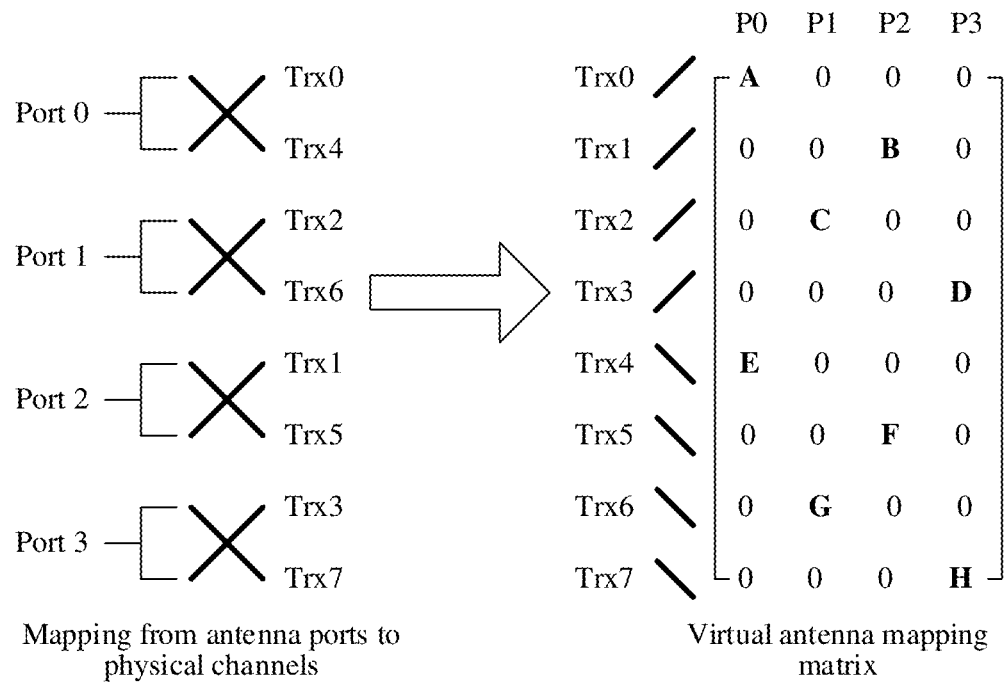
FIG. 3 is a schematic diagram of a mapping relationship according to an embodiment of this application.
FIG. 4 is a schematic diagram of a virtual antenna mapping matrix according to an embodiment of this application.

FIG. 3 is a schematic diagram of a mapping relationship according to an embodiment of this application.

In the embodiment shown in FIG. 3, a port 0 to a port 3 and $P_0$ to $P_3$ represent antenna port numbers, and $Trx_0$ to $Trx_0$ represent physical channel numbers. Assuming that each antenna port is mapped to two physical channels, mapping from the antenna ports to the physical channels may be represented as a schematic diagram on the left side of FIG. 3, and a corresponding VAM matrix may be represented as a schematic diagram on the right side of FIG. 3. An amplitude and a phase of an element in the matrix are properly configured, so that different VAM matrices can represent different performance, to meet a plurality of requirements.

Optionally, FIG. 3 uses an example in which N=8 and each antenna port is mapped to two physical channels. During actual application, there may be another case for a value of N and the mapping relationship between the antenna ports and the physical channels. For example, when N=8, one antenna port may be mapped to three, four, or five physical channels. Alternatively, N may be 16, 32, or another integer greater than 4, to implement mapping from four antenna ports to 16, 32, or more physical channels, provided that each antenna port is mapped to at least one physical channel, and one physical channel is mapped only to one antenna port. This is not specifically limited herein.

In this embodiment of this application, the value of N is not limited, and is selected based on an actual application requirement. This is not specifically limited herein. In this embodiment of this application, the wireless communication method may be applied to a scenario of mapping between different quantities of antenna ports and physical channels, and can support communication between a plurality of terminal devices and the network device. This improves flexibility of technical solutions of this application.

For brevity of description, N=8 is used as an example in the following description.

202: Obtain channel state information of a target terminal device in a target cell, where a protocol used by the target terminal device in a communication state is an LTE R8 protocol.

The terminal device may periodically or aperiodically report the channel state information to the network device, in other words, the network device may obtain the channel state information. The target terminal device is a terminal device in a range of the target cell covered by the network device, and the protocol used by the target terminal device in the communication state is the LTE R8 protocol. In other words, a maximum quantity of antenna ports supported by the target terminal device is 4.

For example, assuming that there are 100 terminal devices in the target cell, 40 terminal devices support the LTE R8 protocol (to be specific, each support four antenna ports), and the other 60 devices support an LTE R10 protocol (to be specific, each support eight antenna ports), the channel state information obtained by the network device is information sent by the 40 target terminal devices that support the LTE R8 protocol.

It should be noted that there is no necessary sequence between step 201 and step 202. Step 201 may be performed first, or step 202 may be performed first, or step 201 and step 202 may be performed simultaneously, provided that the two steps are performed before step 203. This is not specifically limited herein.

203: Determine, based on the channel state information, that the mapping relationship between the four antenna ports and the N physical channels is a mapping relationship indicated by a target virtual antenna mapping matrix, where the target virtual antenna mapping matrix is included in the at least two virtual antenna mapping matrices.

After obtaining the channel state information, the network device may determine the target VAM matrix from the at least two VAM matrices based on the channel state information. In other words, the network device determines that the mapping relationship between the four antenna ports and the N physical channels is the mapping relationship indicated by the target VAM.

Specifically, the channel state information includes channel quality indicator (channel quality indicator, CQI) information and rank indication (RI) information. The CQI information is used to measure beamforming effects of different VAM matrices, and measure a signal-to-noise ratio (SNR) of each codeword. The RI information is used to measure space division multiplexing effects of different VAM matrices. After obtaining CQI information reported by each target terminal device in the target cell, the network device detects the CQI information to obtain adjustment information corresponding to the CQI information. Then, the network device determines a channel characteristic of each target terminal device based on the CQI information, adjustment information, and IR information that correspond to each target terminal device. Because channel characteristics of the target terminal devices may be different, the network device may select channel characteristics corresponding to a largest quantity of target terminal devices as a basis for determining and selecting the target virtual antenna matrix.

For example, FIG. 4 is a schematic diagram of a virtual antenna mapping matrix according to an embodiment of this application.

In the embodiment shown in FIG. 4, a virtual antenna mapping matrix 0 ($Vam_0$) has a better space division multiplexing effect, and a virtual antenna mapping matrix 1 ($Vam_1$) has a better beamforming effect.

It is assumed that in 60 target terminal devices in the target cell, channel characteristics corresponding to 40 target terminal devices are A, and channel characteristics corresponding to 20 target terminal devices are B. In this case, the network device may determine that the target virtual antenna mapping matrix is a matrix corresponding to the channel characteristics A. If the network device determines that when the channel characteristics are A, the target cell is more suitable for the virtual antenna mapping matrix with a better space division multiplexing effect, the network device determines that the target virtual antenna mapping matrix is $Vam_0$. If the network device determines that when the channel characteristics are A, the target cell is more suitable for the virtual antenna mapping matrix with a better beamforming effect, the network device determines that the target virtual antenna mapping matrix is $Vam_1$.

Optionally, in $Vam_0$, values of $a_1$, $b_1$, $c_2$, and $d_2$ are 1. In other words, the value is a complex number having only a real part but no imaginary part. Values of $a_2$, $b_2$, $c_1$, and $d_1$ may be j. In other words, the value is a complex number having only an imaginary part but no real part. Optionally, in $Vam_1$, values of $A_1$, $B_1$, $C_1$, and $D_1$ are 1. In other words, the value is a complex number having only a real part but no imaginary part. Values of $A_2$, $B_2$, $C_2$, and $D_2$ may be j. In other words, the value is a complex number having only an imaginary part but no real part.

In this embodiment of this application, after obtaining the CQI information, the network device detects and adjusts the CQI information so that the determined channel characteristic is more accurate, to improve accuracy of mapping of the antenna ports.

In this embodiment of this application, when mapping the four antenna ports to the N physical channels, the network device may configure a plurality of VAM matrices. In addition, the network device selects and determines, based on a channel state of the target terminal device in the target cell, the target VAM matrix that matches the channel state of the target terminal device from the plurality of VAM matrices, and performs wireless communication with the target terminal device by using the target virtual antenna mapping matrix. Therefore, flexibility of wireless communication is improved. The protocol used by the target terminal device during communication is the LTE R8 protocol, and N is an integer greater than 4.

204: Perform wireless communication with the target terminal device by using the target virtual antenna mapping matrix.

After determining the target virtual antenna mapping matrix, the network device performs wireless communication with the target terminal device in the target cell by using the target virtual antenna mapping matrix. Specifically, the network device performs weighted processing on user data to be sent to the terminal device and a cell-specific reference signal of the target cell, to enable the target virtual matrix to be in a working state. The network device can communicate with the target terminal device by using the target virtual antenna mapping matrix. The cell-specific reference signal is used to perform downlink channel quality measurement and downlink channel estimation.

Optionally, the network device may monitor the target terminal device in the target cell in real time, obtain the channel characteristic in real time, and switch the target virtual antenna mapping matrix in time when the channel characteristic changes, so that a switched-to virtual antenna matrix better meets a requirement of an actual communication situation.

Figure 5:
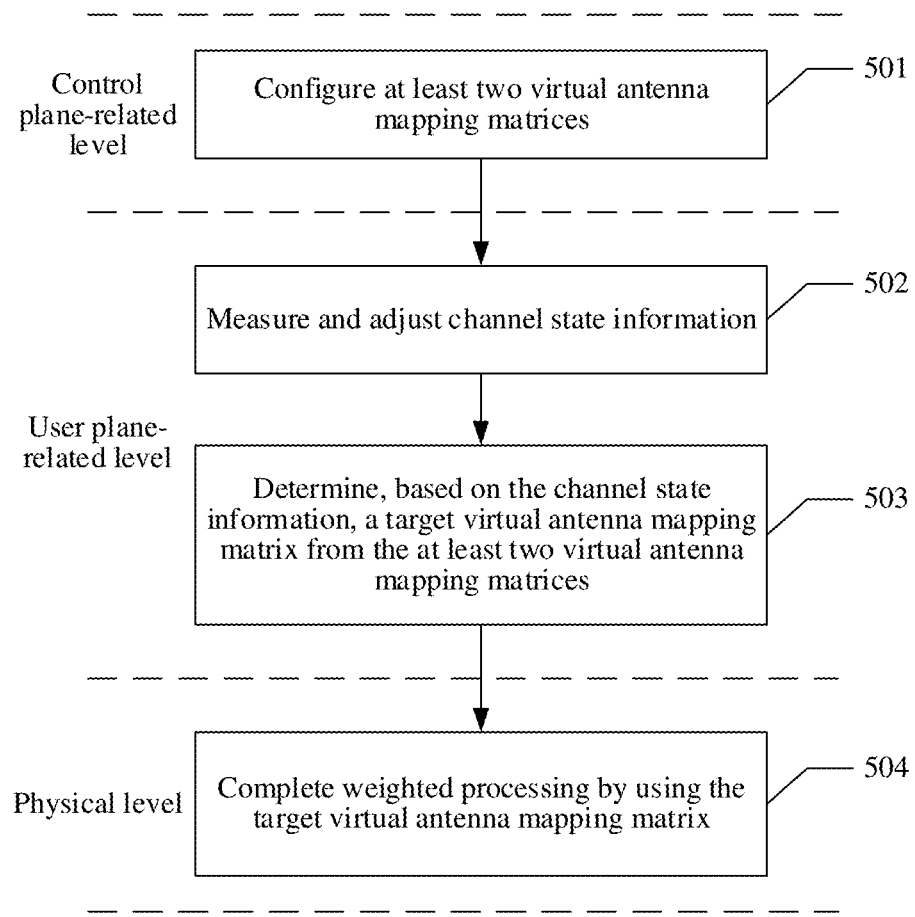
FIG. 5 is another schematic flowchart of a wireless communication method according to an embodiment of this application.

The following describes the wireless communication method provided in embodiments of this application from a perspective of a network device level. FIG. 5 is another schematic flowchart of a wireless communication method according to an embodiment of this application. The method includes the following steps.

501: At a control plane-related level, a network device configures at least two virtual antenna mapping matrices. Step 501 is similar to step 201 in the embodiment shown in FIG. 2, and details are not described herein again.

502: At a user plane-related level, the network device measures and adjusts channel state information.

Specifically, a channel state measurement module may obtain channel state information of a target terminal device, where the channel state information includes channel quality indicator information and rank indication information. A channel quality indicator adjustment module can detect the channel quality indicator information to obtain an adjustment amount of the channel quality indicator information. For a specific process, refer to step 202 in the embodiment shown in FIG. 2, and details are not described herein again. The user plane-related layer is mainly used to process data on a user side.

503: At the user plane-related level, the network device determines a target virtual antenna mapping matrix from the at least two virtual antenna mapping matrices based on the channel state information.

A downlink scheduling module in the network device may determine a channel characteristic based on the channel quality indicator information, the rank indication information, and adjustment information, and then determine the target virtual antenna mapping matrix based on the channel characteristic. For a specific process, refer to step 203 in the embodiment shown in FIG. 2, and details are not described herein again.

504: At a physical level, the network device completes weighted processing by using the target virtual antenna mapping matrix.

After determining the target virtual antenna mapping matrix, the network device performs, at the physical level by using the target virtual antenna mapping matrix, weighted processing on user data to be sent to the target terminal device and a cell-specific reference signal of a target cell, to enable the target terminal device to perform communication by using the target virtual antenna mapping matrix. For example, the physical level includes a baseband.

Figure 6:
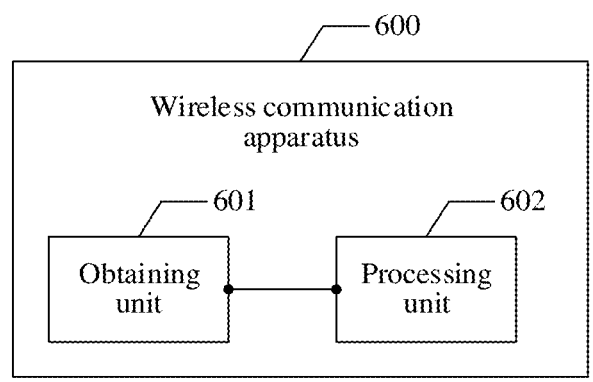
FIG. 6 is a schematic diagram of a structure of a wireless communication apparatus according to an embodiment of this application.

Embodiments of this application further provide a wireless communication apparatus. FIG. 6 is a schematic diagram of a structure of a wireless communication apparatus 600 according to an embodiment of this application. The wireless communication apparatus 600 includes: a processing unit 602, configured to configure at least two virtual antenna mapping matrices, where each of the at least two virtual antenna mapping matrices indicates a mapping relationship between four antenna ports and N physical channels, and N is an integer greater than 4; and an obtaining unit 601, configured to obtain channel state information of a target terminal device in a target cell, where a protocol used by the target terminal device in a communication state is an LTE R8 protocol.

The processing unit 602 is further configured to: determine, based on the channel state information, that the mapping relationship between the four antenna ports and the N physical channels is a mapping relationship indicated by a target virtual antenna mapping matrix, where the target virtual antenna mapping matrix is included in the at least two virtual antenna mapping matrices; and perform wireless communication with the target terminal device by using the target virtual antenna matrix.

In some optional embodiments, the channel state information includes channel quality indicator information and rank indication information. The processing unit 602 is specifically configured to: detect the channel quality indicator information to obtain adjustment information corresponding to the channel quality indicator information; determine a channel characteristic of the target terminal device based on the channel indicator information, the adjustment information, and the rank indication information; and determine, based on the channel characteristic, that the mapping relationship between the four antenna ports and the N physical channels is the mapping relationship indicated by the target virtual antenna mapping matrix.

In some optional embodiments, N is 2 raised to the power of M, M is an integer greater than or equal to 3, each of the four antenna ports establishes a mapping relationship to at least one of the N physical channels, and each of the N physical channels is mapped to one antenna port.

In some optional embodiments, the processing unit 602 is specifically configured to perform, by using the target virtual antenna mapping matrix, weighted processing on user data to be sent to the target terminal device and a cell-specific reference signal of the target cell, to enable the target terminal device to perform communication by using the target virtual antenna mapping matrix.

The wireless communication apparatus 600 may perform operations performed by the access network device in the embodiment shown in FIG. 1 and operations performed by the network device in the embodiments shown in FIG. 2 to FIG. 5. Details are not described herein again.

Figure 7:
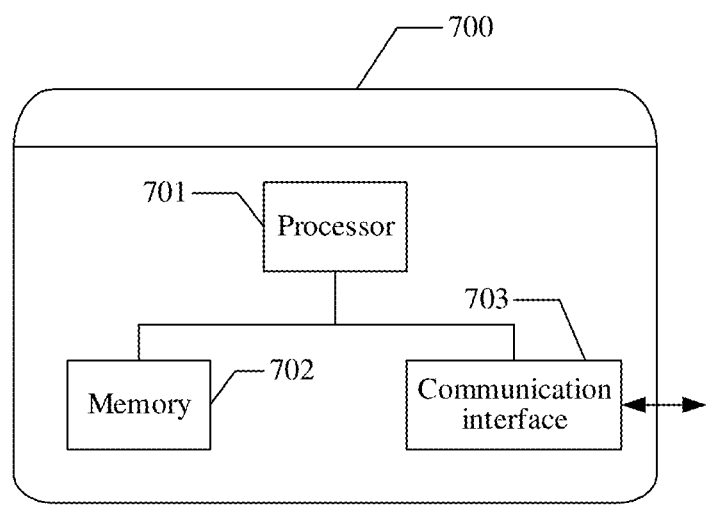
FIG. 7 is a schematic diagram of a structure of a network device according to an embodiment of this application.

The following describes the network device provided in embodiments of this application. FIG. 7 is a schematic diagram of a structure of a network device according to an embodiment of this application. The network device 700 includes a processor 701 and a memory 702. The memory 702 stores one or more application programs or data.

The memory 702 may be a volatile memory or a persistent memory. The program stored in the memory 702 may include one or more modules, and each module may be configured to perform a series of operations performed by the network device 700. Further, the processor 701 may communicate with the memory 702, and perform a series of instruction operations in the memory 702 on the network device 700. The processor 701 may be a central processing unit (central processing unit, CPU), or a single-core processor. In addition, the processor 701 may be another type of processor, for example, a dual-core processor. This is not specifically limited herein.

The network device 700 may further include one or more communication interfaces 703 and one or more operating systems, for example, Windows Server™, Mac OS X™, Unix™, Linux™ or FreeBSD™.

The network device 700 may perform operations performed by the access network device in the embodiment shown in FIG. 1 and operations performed by the network device in the embodiments shown in FIG. 2 to FIG. 5. Details are not described herein again.

A person skilled in the art may clearly understand that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that, the disclosed system, apparatus, and method may be implemented in another manner. For example, the described apparatus embodiment is merely an example. For example, division into the units is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may or may not be physical units, that is, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A method, comprising:
configuring at least two virtual antenna mapping matrices, wherein each of the at least two virtual antenna mapping matrices indicates a respective mapping relationship between four antenna ports and N physical channels, and N is an integer greater than 4, and wherein different ones of the at least two virtual antennal mapping matrices indicate a different mapping of the four antenna ports to the N physical channels;
obtaining channel state information of a target terminal device in a target cell;
selecting, based on the channel state information, a target virtual antenna mapping matrix from the at least two virtual antenna mapping matrices, wherein the target virtual antenna mapping matrix indicates a first mapping relationship between the four antenna ports and the N physical channels; and
performing wireless communication with the target terminal device based on the target virtual antenna mapping matrix.

2. The method according to claim 1, wherein the channel state information comprises channel quality indicator information and rank indication information.

3. The method according to claim 2, wherein determining, based on the channel state information, the target virtual antenna mapping matrix comprises:
detecting the channel quality indicator information to obtain adjustment information corresponding to the channel quality indicator information;
determining a channel characteristic of the target terminal device based on the channel quality indicator information, the adjustment information, and the rank indication information; and
selecting, based on the channel characteristic, the target virtual antenna mapping matrix from the at least two virtual antenna mapping matrices.

4. The method according to claim 1, wherein N is 2 raised to the power of M, M is an integer greater than or equal to 3.

5. The method according to claim 4, wherein each of the four antenna ports establishes a mapping relationship to at least one of the N physical channels, and each of the N physical channels is mapped to one antenna port of the four antenna ports.

6. The method according to claim 1, wherein performing the wireless communication with the target terminal device based on the target virtual antenna mapping matrix comprises:
performing, based on the target virtual antenna mapping matrix, weighted processing on user data to be sent to the target terminal device and a cell-specific reference signal of the target cell, to enable the target terminal device to perform communication based on the target virtual antenna mapping matrix.

7. An apparatus, comprising:
a memory storage comprising instructions; and
one or more processors in communication with the memory storage, wherein the one or more processors execute the instructions for:
configuring at least two virtual antenna mapping matrices, wherein each of the at least two virtual antenna mapping matrices indicates a respective mapping relationship between four antenna ports and N physical channels, and N is an integer greater than 4, and wherein different ones of the at least two virtual antennal mapping matrices indicate a different mapping of the four antenna ports to the N physical channels;
obtaining channel state information of a target terminal device in a target cell;
determining, based on the channel state information, a target virtual antenna mapping matrix from the at least two virtual antenna mapping matrices, wherein the target virtual antenna mapping matrix indicates a first mapping relationship between the four antenna ports and the N physical channels; and performing wireless communication with the target terminal device based on the target virtual antenna mapping matrix.

8. The apparatus according to claim 7, wherein the channel state information comprises channel quality indicator information and rank indication information.

9. The apparatus according to claim 8, wherein the instructions for determining, based on the channel state information, the target virtual antenna mapping matrix includes specific instructions for:
- detect the channel quality indicator information to obtain adjustment information corresponding to the channel quality indicator information;
- determine a channel characteristic of the target terminal device based on the channel quality indicator information, the adjustment information, and the rank indication information; and
- select, based on the channel characteristic, the target virtual antenna mapping matrix from the at least two virtual antenna mapping matrices.

10. The apparatus according to claim 7, wherein N is 2 raised to the power of M, M is an integer greater than or equal to 3.

11. The apparatus according to claim 10, wherein each of the four antenna ports establishes a mapping relationship to at least one of the N physical channels, and each of the N physical channels is mapped to one antenna port of the four antenna ports.

12. The apparatus according to claim 7, wherein instructions for performing wireless communication with the target terminal device based on the target virtual antenna mapping matrix includes specific instructions for performing, based on the target virtual antenna mapping matrix, weighted processing on user data to be sent to the target terminal device and a cell-specific reference signal of the target cell, to enable the target terminal device to perform communication based on the target virtual antenna mapping matrix.

13. A non-transitory computer-readable storage medium, wherein the non-transitory computer-readable storage medium stores a program, when a computer executes the program, causes the computer to perform a method comprising:
- configuring at least two virtual antenna mapping matrices, wherein each of the at least two virtual antenna mapping matrices indicates a respective mapping relationship between four antenna ports and N physical channels, and N is an integer greater than 4, and wherein different ones of the at least two virtual antennal mapping matrices indicate a different mapping of the four antenna ports to the N physical channels;
- obtaining channel state information of a target terminal device in a target cell;
- determining, based on the channel state information, a target virtual antenna mapping matrix from the at least two virtual antenna mapping matrices, wherein the target virtual antenna mapping matrix indicates a first mapping relationship between the four antenna ports and the N physical channels; and
- performing wireless communication with the target terminal device based on the target virtual antenna mapping matrix.

14. The non-transitory computer-readable storage medium according to claim 13, wherein the channel state information comprises channel quality indicator information and rank indication information.

15. The non-transitory computer-readable storage medium according to claim 14, wherein determining, based on the channel state information, the target virtual antenna mapping matrix comprises:
- detecting the channel quality indicator information to obtain adjustment information corresponding to the channel quality indicator information;
- determining a channel characteristic of the target terminal device based on the channel quality indicator information, the adjustment information, and the rank indication information; and
- determining, based on the channel characteristic, the target virtual antenna mapping matrix.

16. The non-transitory computer-readable storage medium according to claim 13, wherein N is 2 raised to the power of M, M is an integer greater than or equal to 3.

17. The non-transitory computer-readable storage medium according to claim 16, wherein each of the four antenna ports establishes a mapping relationship to at least one of the N physical channels, and each of the N physical channels is mapped to one antenna port of the four antenna ports.

18. The non-transitory computer-readable storage medium according to claim 13, wherein performing the wireless communication with the target terminal device based on the target virtual antenna mapping matrix comprises:
- performing, based on the target virtual antenna mapping matrix, weighted processing on user data to be sent to the target terminal device and a cell-specific reference signal of the target cell, to enable the target terminal device to perform communication based on the target virtual antenna mapping matrix.

* * * * *